United States Patent [19]
Jeenicke et al.

[11] Patent Number: 5,737,224
[45] Date of Patent: Apr. 7, 1998

[54] APPARATUS AND METHOD FOR TRIPPING A SYSTEM FOR THE PROTECTION OF OCCUPANTS OF A VEHICLE

[75] Inventors: Edmund Jeenicke, Schwieberdingen; Bernhard Mattes, Sachsenheim; Claus Condne, Wadgassen; Michael Henne, Ditzingen-Schockingen, all of Germany

[73] Assignee: Robert Bosch GmbH, Stuttgart, Germany

[21] Appl. No.: 478,075

[22] Filed: Jun. 7, 1995

Related U.S. Application Data

[63] Continuation of Ser. No. 659,366, filed as PCT/EP88/00850, Sep. 17, 1988, Pat. No. 5,483,447.

[51] Int. Cl.$^6$ .................. G06G 7/76; B60R 21/32
[52] U.S. Cl. .................. 364/424.055; 364/424.045; 307/10.1; 280/735; 180/282; 180/271; 340/436
[58] Field of Search .................. 364/424.05, 424.01; 280/735, 806, 756, 734, 801.1, 802; 340/436, 669; 180/282, 271, 274, 268; 307/10.1, 9.1; 242/384.4, 384.6

[56] References Cited

U.S. PATENT DOCUMENTS

| | | | |
|---|---|---|---|
| 3,848,695 | 11/1974 | Lacaze, Jr. | 180/103 |
| 3,851,305 | 11/1974 | Baba et al. | 180/274 |
| 3,863,208 | 1/1975 | Balban | 280/735 |
| 3,889,130 | 6/1975 | Breed | 280/735 |
| 3,911,391 | 10/1975 | Held et al. | 180/274 |
| 4,583,404 | 4/1986 | Bernard et al. | 73/514.18 |
| 4,715,468 | 12/1987 | Baumann et al. | 180/271 |
| 4,819,960 | 4/1989 | Breed | 280/734 |
| 4,836,024 | 6/1989 | Woehrl et al. | 307/10.1 |
| 4,932,260 | 6/1990 | Norton | 73/503 |
| 4,978,087 | 12/1990 | Tauber | 242/384.4 |
| 4,985,835 | 1/1991 | Sterler et al. | 340/669 |
| 4,994,972 | 2/1991 | Diller | 364/424.056 |
| 5,014,810 | 5/1991 | Mattes et al. | 180/268 |
| 5,037,129 | 8/1991 | Fritz et al. | 364/424.056 |
| 5,068,793 | 11/1991 | Condne et al. | 364/424.056 |
| 5,083,276 | 1/1992 | Okano et al. | 364/424.056 |
| 5,146,104 | 9/1992 | Schumacher et al. | 307/10.1 |
| 5,157,268 | 10/1992 | Spies et al. | 307/10.1 |
| 5,164,901 | 11/1992 | Blackburn et al. | 364/424.057 |
| 5,173,614 | 12/1992 | Woehrl et al. | 307/10.1 |
| 5,182,459 | 1/1993 | Okano et al. | 364/424.056 |
| 5,208,484 | 5/1993 | Okano et al. | 340/436 |
| 5,261,506 | 11/1993 | Jost | 180/282 |
| 5,283,472 | 2/1994 | Takeuchi et al. | 340/436 |
| 5,449,198 | 9/1995 | Jeenicke et al. | 340/436 |
| 5,483,447 | 1/1996 | Jeenicke et al. | 364/424.055 |

FOREIGN PATENT DOCUMENTS 25 41 775  8/1984  France.

*Primary Examiner*—Jacques Louis-Jacques
*Attorney, Agent, or Firm*—Kenyon & Kenyon

[57] ABSTRACT

An apparatus for tripping a system for the protection of occupants of a vehicle has a first sensor (10) for sensing the acceleration of the vehicle in its direction of forward motion and a second sensor (12) for sensing the acceleration of the vehicle in a direction transverse to its direction of forward motion. The two sensors are under the control of control means (14,16) which triggers the occupant protection system in dependence upon the signals from the first and second sensors (10,12).

32 Claims, 2 Drawing Sheets

APPARATUS AND METHOD FOR TRIPPING A SYSTEM FOR THE PROTECTION OF OCCUPANTS OF A VEHICLE

This application is a continuation of application Ser. No. 07/659,366, filed Mar. 15, 1991, now U.S. Pat. No. 5,483,447, which in turn is the U.S. national phase of PCT/EP88/00850, filed Sep. 17, 1988.

STATE OF THE ART

The present invention relates to an apparatus and method for actuating a safety system for a motor vehicle based upon the signals generated by an acceleration sensor.

In known vehicle occupant restraining devices, such as inflatable airbags, the devices are actuated when the acceleration of the vehicle, as measured by an accelerometer, is above a certain value which indicates that the vehicle has crashed. However, the known sensor systems often actuate the restraining devices too late if the impact is oblique (e.g. 30°) or if the impact is a slow offset crash. This is due mainly to the greatly differing energy absorption behavior of vehicles having a crumple zone in the case of frontal and oblique impacts.

Known systems for determining the acceleration of the vehicle are either in the form of a central sensor system or in the form of a plurality of decentralized sensors. However, in both cases, the acceleration signal is measured only in the longitudinal direction of motion of the vehicle, resulting in problems in actuating the occupant restraining device when a significant acceleration is experienced along an axis other than the longitudinal direction of motion of the vehicle.

In U.S. Pat. No. 3,851,305 (Column 8, lines 14-23) an electric collision detecting system is described wherein a collision detector is provided for producing a collision signal when an object contacts the motor vehicle, and wherein a deceleration detector is provided for producing a real deceleration signal. Both detector types are arranged apart from each other in the front part of the vehicle.

It is an object of the present invention to provide an apparatus and method of triggering vehicle occupant restraining devices which will be effective in actuating the devices even if an impact on the vehicle is not a frontal impact.

This is achieved by adopting the features set forth in claim 1.

Further advantages are obtained by the features of claims 2 to 6.

DRAWINGS

By way of example only, specific embodiments of the present invention will now be described, with reference to the accompanying drawings, in which.

DESCRIPTION OF THE EXEMPLARY EMBODIMENTS

Figure 1:
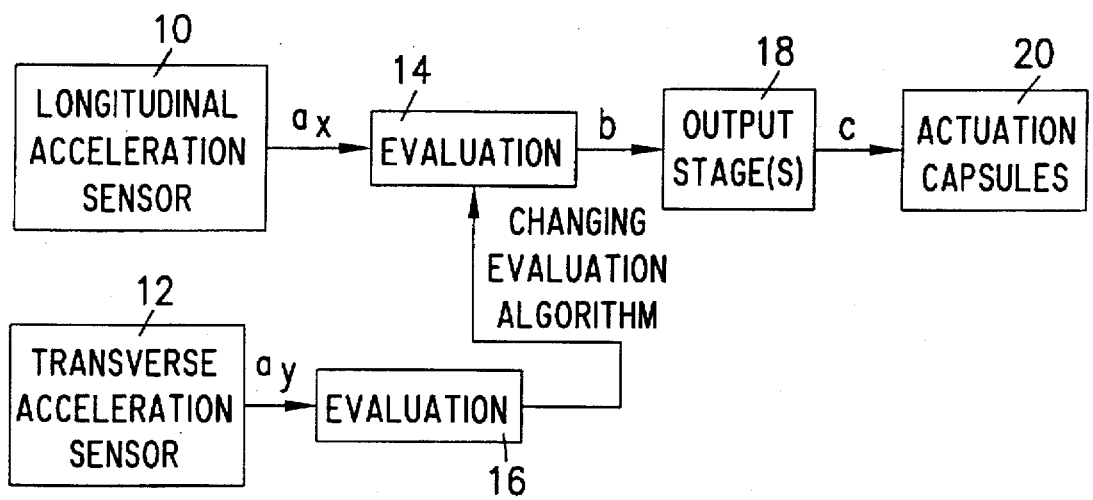
FIG. 1 is a diagrammatic representation of a first embodiment of a triggering apparatus for an inflatable airbag, in accordance with the present invention.

Referring firstly to the first embodiment, illustrated in FIG. 1, the apparatus comprises a sensor 10 for detecting the acceleration of a vehicle along an axis parallel to the forward direction of motion of the vehicle (hereinafter referred to as the longitudinal direction), and a sensor 12 for detecting the acceleration of the vehicle along an axis inclined at right angles to the longitudinal axis (hereinafter referred to as the transverse direction). The longitudinal acceleration sensor 10 and the transverse acceleration sensor 12 feed signals $a_x$ and $a_y$ to respective evaluation devices 14, 16. The evaluation devices 14, 16 may, for example, be in the form of electronic integrators.

If the evaluation means 14 determines that the longitudinal acceleration is greater than a predetermined threshold value then the evaluation means 14 sends a signal b to an output stage 18 which is in the form of a transistor switch. The output stage 18 is effectively an electrical or electronic switch actuated by the signal b, and sends a further signal c which actuates actuation capsules 20, the present example being for the case of an inflatable restraining bag.

It will be noted from FIG. 1 that the output of the evaluation means 16 relating to the transverse acceleration is fed into the evaluation means 14 relating to the longitudinal acceleration. The signal from the evaluation means 16 relating to the transverse acceleration is used to change the evaluation algorithm of the evaluation means 14 relating to the longitudinal acceleration. In this way, even if the longitudinal acceleration sensed is not above the threshold value for actuating the actuation capsules 20, the evaluation means 14 may determine, upon receipt of the signal from the evaluation means 16, that the overall acceleration of the vehicle is sufficient for the actuation capsule 20 to be actuated, even though neither of the longitudinal and transverse accelerations would, by themselves, be sufficient to do so. It is also useful when, because of the nature of the impact of the vehicle, such as an oblique impact, the eventual acceleration would be sufficient in one direction for the actuation capsules 20 to be actuated, but only after a delay. The present invention reduces the said delay considerably.

Figure 2:
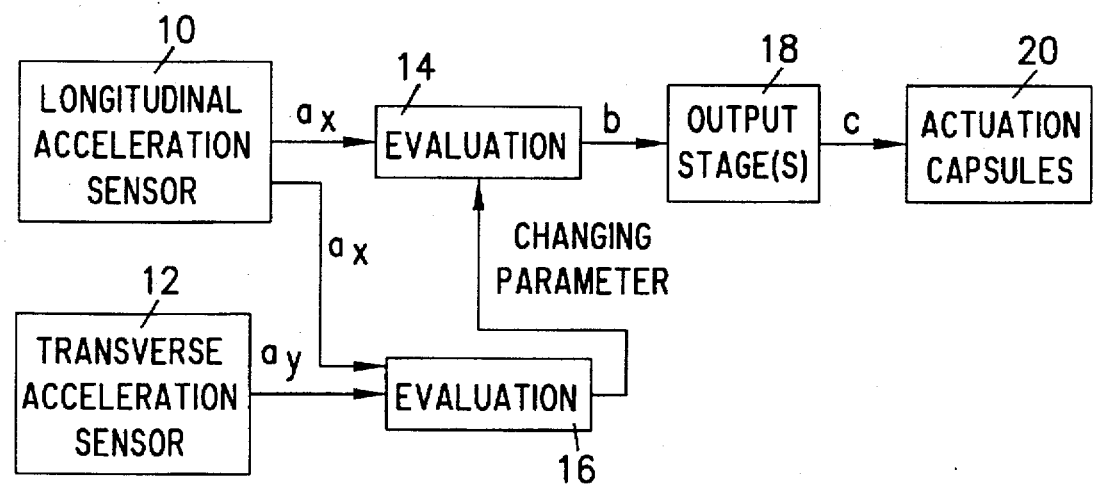
FIG. 2 is a diagrammatic representation of a second embodiment of a triggering apparatus for an inflatable airbag, in accordance with the present invention.

The second embodiment, illustrated in FIG. 2, has the same components as the first embodiment, illustrated in FIG. 1. However, the signal $a_x$ from the longitudinal acceleration sensor 10 is also sent to the transverse evaluation means 16, in addition to the longitudinal evaluation means 14.

As before, the longitudinal acceleration still forms the basis of calculating whether the actuation capsules 20 are to be actuated. However, the two signals $a_x$ and $a_y$ from the longitudinal and transverse acceleration sensors 10, 12 are processed together in the transverse evaluation means 16. In this way, the overall magnitude and direction of the acceleration of the vehicle can be determined, and the output of the evaluation means 16 can be used to change the actuation parameters of the longitudinal evaluation means 14. For example, even if the longitudinal acceleration $a_x$ is not sufficient for the evaluation means 14 to actuate the actuation capsules 20, then, depending on the signal from the evaluation means 16, the evaluation means 14 may still send a signal b to the output stage 18, which in turn actuates the actuation capsules 20 by virtue of a signal c.

The second embodiment thus permits actuation of the actuation capsules 20 in certain predetermined conditions.

Figure 3:
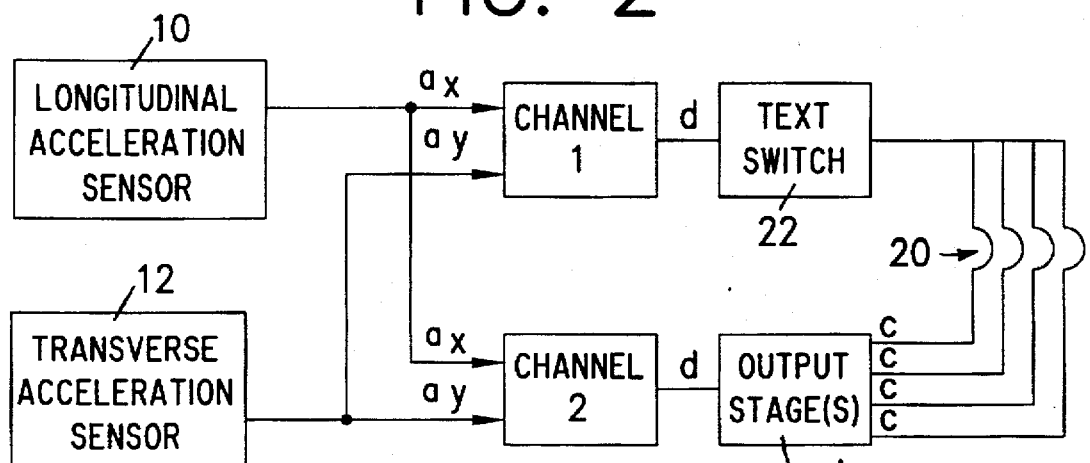
FIG. 3 is a diagrammatic representation of a third embodiment of a triggering apparatus for an inflatable airbag, in accordance with the present invention.

The third embodiment, illustrated in FIG. 3, is provided with longitudinal and transverse acceleration sensors 10, 12. Two evaluation channels, channel 1 and channel 2, are provided, and the outputs $a_x$, $a_y$ from the sensors 10, 12 are fed into each of the evaluation channels 1 and 2. The channels 1 and 2 may comprise, for example, components 14 and 16 of FIG. 1 or FIG. 2, and operate in the same way as described in the first and second embodiments respectively, described above. Each channel 1 and 2 can then determine, independently of the other channel, whether the components of the acceleration of the vehicle reach the predetermined threshold values, and in the case of a positive response, each channel outputs a signal d. The output from channel 1 is fed into a test switch 22, whereas the output of channel 2 is fed into an output stage 18', which has a similar function to the output stage 18 of the first and second embodiments, but which has four outputs for providing an actuating signal c to each of four actuation capsules 20, illustrated schematically. The test switch 22 is a further output stage, and in this particular embodiment is identical to output stage 18', or any other transistor switch. The actuation capsules are connected between the output stage 18' and the test switch 22. This arrangement means that the actuation capsules 20 may only be actuated if a signal is received from both of the channels, 1 and 2. This guards against possible mis-evaluation in one of the channels, since the capsules are actuated only if both channels determine that the conditions of acceleration for actuation of the capsules have been met.

Figure 4:
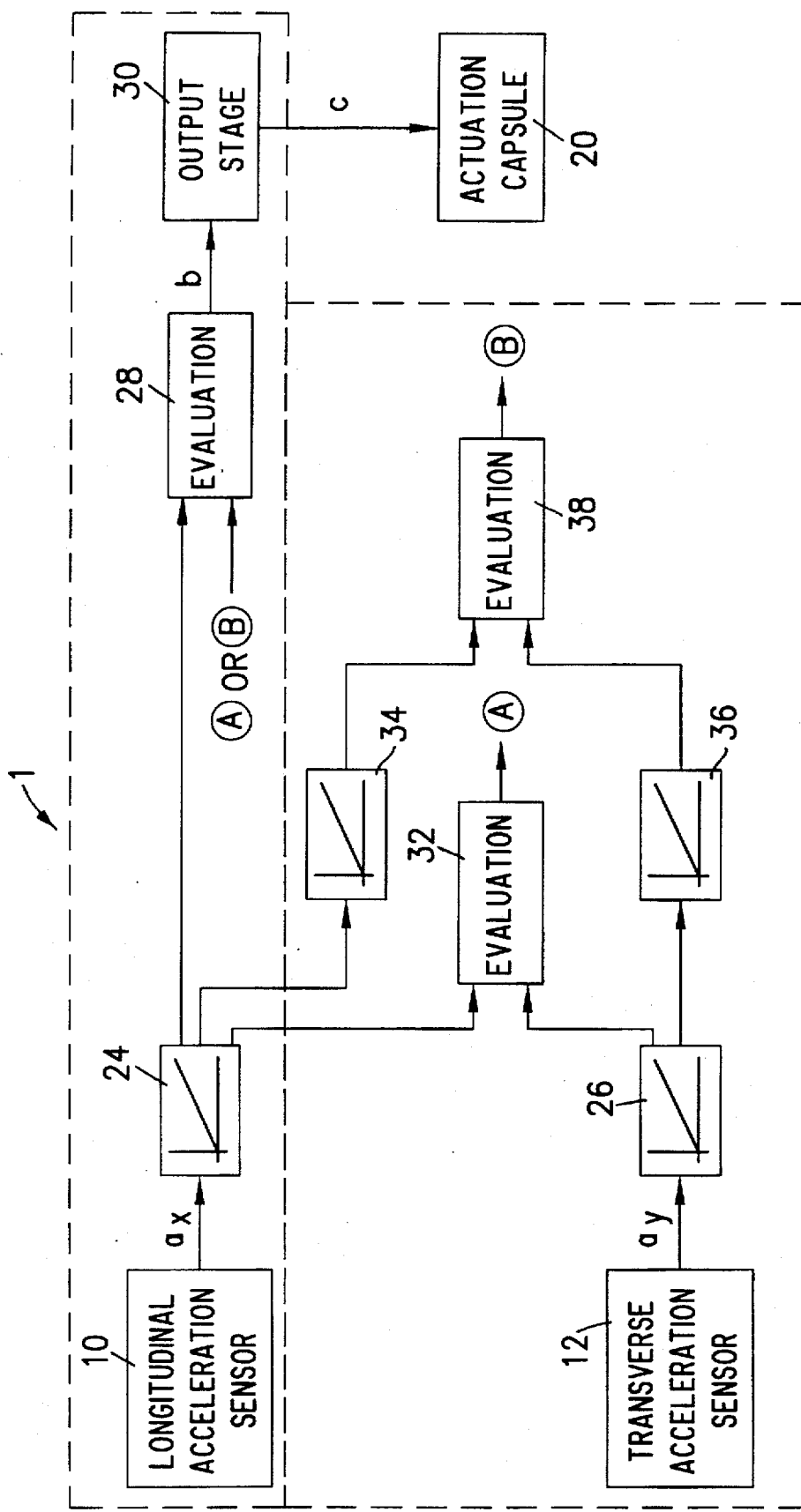
FIG. 4 is a diagrammatic representation of a fourth embodiment of a triggering apparatus for an inflatable airbag, in accordance with the present invention.

The fourth embodiment, illustrated in FIG. 4, also has longitudinal and transverse acceleration sensors 10, 12. The acceleration signals $a_x$ and $a_y$ are fed to respective integrators 24, 26. The integrated signal from $a_x$ is then fed directly to evaluation means 28 which determines whether the signal from the integrator 24 is above the predetermined threshold value. If this is indeed the case, i.e. that the longitudinal acceleration is such that the restraining means should be used, the evaluation means 28 feeds a signal b to an output stage 30, which in turn feeds an actuating signal c to the (or each) actuation capsule 20.

The integrated signals from the integrators 24, 26 are also fed to a second evaluation means 32. Depending upon the relative magnitudes of the two signals $a_x$ and $a_y$, the magnitude and the direction of the acceleration of the vehicle can be determined, and if they are such as to exceed the predetermined threshold values of the second evaluation means 32 (i.e. they are of such relative strengths that an impact which requires actuation of the safety means has occurred) a signal A is output, and fed into the first evaluation means 28, which, as previously, acts to actuate the actuation capsules 20.

The output signals of the integrators 24, 26 are also each fed to a further respective integrator 34, 36, and the output of the further integrators 34, 36 are fed into a third evaluation means 38. If the relative values of the two doubly-integrated signals exceed the predetermined values (which indicates that an impact requiring the actuation of the restraining device is required) then a signal B is output from the evaluation means 38 and input into the first evaluation means 28. The first evaluation means 28 then acts to actuate the actuation capsules 20.

Thus, the fourth embodiment can act to actuate the actuation capsules 20 where the longitudinal acceleration by itself would not be sufficient to trip the actuation, but where the overall acceleration requires that tripping should occur. It is also most beneficial in the case where the longitudinal acceleration would eventually be sufficient to trip the actuation capsules 20, but only after a delay. This embodiment often allows earlier tripping of the actuation capsules, especially where an oblique impact is involved.

The present invention has the advantage that, compared with decentralized sensors, the arrangement of the sensors in a centralized unit results in lower installation costs and less risk caused by damage to cable strands. The present invention is also particularly suitable for adapting existing vehicles, as opposed to fitting the system in a new vehicle, during construction.

The present invention has been described mainly with reference to actuation of an air bag, but it should be appreciated that it can equally well be applied to other safety systems. For example, the signals b or c from the output stages may be used to tighten safety belts and/or actuate a central door locking system and/or actuate a flashing warning light system.

The present invention also has the advantage that separate additional functions can be controlled by all round detection of acceleration. For example, central locking and flashing warning systems might have all round sensitivity, i.e. may be actuated when the acceleration in any direction exceeds a predetermined value, an airbag might only be activated in the case of the frontal acceleration component reaching a threshold value, whereas belt tightness and central belt locking might be activated in an all round sensitive manner, depending on the wishes of the vehicle owner.

The second sensor need not detect acceleration in the transverse direction, but may, for example, detect acceleration in a direction other than at right angles to the direction of forward motion. For example, the sensor 12 may be adapted to detect acceleration in a direction of oblique impact, e.g. 30 degrees to the direction of forward motion.

We claim:

1. An apparatus for actuating a safety device for the protection of at least one occupant of a vehicle, comprising:
    a first sensor for generating a first signal indicative of an acceleration of the vehicle along a first axis oriented in the direction of forward motion of the vehicle;
    a second sensor for generating a second signal indicative of an acceleration of the vehicle along a second axis oriented at an angle relative to the first axis; and
    a control unit coupled to the first and second sensors and to the safety device, the control unit actuating the safety device as a function of the first signal, the second signal, or a combination thereof exceeding a threshold value, the control unit adjusting the threshold value as a function of the value of at least one of the first signal and the second signal.

2. An apparatus according to claim 1, wherein the second axis is oriented at a right angle relative to the first axis.

3. An apparatus according to claim 1, wherein the control unit changes an evaluation algorithm for evaluating at least one of the first and second signals as a function of the second signal.

4. An apparatus according to claim 1, wherein the first and second sensors are located centrally on the vehicle.

5. An apparatus according to claim 1, wherein the first and second sensors are located within a housing.

6. An apparatus according to claim 1, wherein the control unit includes a first channel coupled to the first sensor to receive the first signal therefrom, and a second channel coupled to the second sensor to receive the second signal therefrom, the first and second channels simultaneously evaluating the first and second signals, respectively.

7. An apparatus for actuating a safety device for the protection of occupants of a vehicle, comprising:
    a first sensor for generating first signals indicative of an acceleration of the vehicle along a first axis oriented in the direction of forward motion of the vehicle;

a second sensor for generating second signals indicative of an acceleration of the vehicle along a second axis oriented at an angle relative to the first axis; and a control unit coupled to the first and second sensors and to the safety device, the control unit actuating the safety device based on the first signals, the second signals, or a combination thereof exceeding a threshold value, the control unit adjusting the threshold value based on the value of either the first or second signals;

wherein the control unit includes a first evaluation unit coupled to the first sensor for receiving the first signals therefrom, and a second evaluation unit coupled to the first evaluation unit and to the second sensor for receiving the second signals therefrom, wherein the second evaluation unit transmits an output signal based on the second signal to the first evaluation unit, and the first evaluation unit, in turn, changes an evaluation algorithm for evaluating the first signal based thereon.

8. A method of actuating a safety device for the protection of at least one occupant of a vehicle, comprising:
   (a) sensing an acceleration of the vehicle along a first axis oriented in the direction of forward motion of the vehicle and generating a first signal indicative thereof;
   (b) sensing an acceleration of the vehicle along a second axis oriented at an angle relative to the first axis and generating a second signal indicative thereof;
   (c) adjusting a threshold value indicative of a vehicle collision as a function of the value of at least one of the first signal and the second signal;
   (d) comparing the value of the first signal or the second signal, or the value of a combination of the first and second signals, to the threshold value; and
   (e) actuating the safety device as a function of the comparison.

9. A method according to claim 8, wherein the second axis is oriented at a right angle relative to the first axis.

10. An apparatus for actuating a safety device for the protection of at least one occupant of a vehicle, comprising:
    a first sensor for generating a first signal indicative of an acceleration of the vehicle along a first axis;
    a second sensor for generating a second signal indicative of an acceleration of the vehicle along a second axis oriented at an angle relative to the first axis; and
    a control unit coupled to the first and second sensors and to the safety device, the control unit controlling actuation of the safety device as a function of the first and second signals, at least one of an actuation parameter and an evaluation algorithm of the control unit being adjusted as a function of at least one of the first signal and the second signal.

11. An apparatus according to claim 10, wherein the second axis is oriented at a right angle relative to the first axis.

12. An apparatus according to claim 10, wherein the second axis is oriented at an acute angle relative to the first axis.

13. An apparatus according to claim 10, wherein the first axis is oriented in the direction of forward motion of the vehicle.

14. An apparatus according to claim 10, wherein the safety device includes at least one airbag.

15. An apparatus according to claim 10, wherein the safety device includes a plurality of occupant restraint devices.

16. An apparatus according to claim 10, wherein the first and second sensors are located centrally on the vehicle.

17. An apparatus according the claim 10, wherein the first and second sensors are located within a housing.

18. An apparatus according to claim 10, wherein the control unit includes a first channel coupled to the first sensor to receive the first signal therefrom, and a second channel coupled to the second sensor to receive the second signal therefrom, the first and second channels simultaneously evaluating the first and second signals, respectively.

19. A method of actuating a safety device for the protection of at least one occupant of a vehicle, comprising:
    (a) sensing an acceleration of the vehicle along a first axis and generating a first signal indicative thereof;
    (b) sensing an acceleration of the vehicle along a second axis oriented at an angle relative to the first axis and generating a second signal indicative thereof;
    (c) adjusting at least one of an actuation parameter and a signal evaluation algorithm as a function of at least one of the first signal and the second signal; and
    (d) actuating the safety device as a function of the first and second signals.

20. An apparatus for actuating a safety device for the protection of an occupant of a vehicle, comprising:
    a first sensor for generating a first signal indicative of an acceleration of the vehicle along a first axis;
    a second sensor for generating a second signal indicative of an acceleration of the vehicle along a second axis oriented at an angle relative to the first axis; and
    a controller coupled to the first and second sensors and to the safety device, the controller controlling actuation of the safety device as a function of the first and second signals, the safety device being actuated if the value of the first signal exceeds an actuation threshold value, regardless of the value of the second signal.

21. An apparatus according to claim 20, wherein the controller determines an accident direction in response to the first and second signals.

22. An apparatus according to claim 21, wherein the safety device includes a plurality of occupant restraint devices, and the controller determines which of the plurality of occupant restraint devices is or are actuated as a function of the determined accident direction.

23. An apparatus according to claim 20, wherein the second axis is oriented at a right angle relative to the first axis.

24. An apparatus according to claim 20, wherein the second axis is oriented at an acute angle relative to the first axis.

25. An apparatus according to claim 20, wherein the first axis is oriented in the direction of forward motion of the vehicle.

26. An apparatus according to claim 20, wherein the first and second sensors are located centrally with respect to the vehicle.

27. An apparatus according to claim 20, wherein the first and second sensors are located within a housing.

28. A method of actuating a safety device for the protection of an occupant of a vehicle, comprising the steps of:
    sensing an acceleration of the vehicle along a first axis and generating a first signal indicative thereof;
    sensing an acceleration of the vehicle along a second axis oriented at an angle relative to the first axis and generating a second signal indicative thereof;
    controlling actuation of the safety device as a function of the first and second signals; and actuating the safety device if the value of the first signal exceeds a threshold value, regardless of the value of the second signal.

29. An apparatus for actuating a safety device for the protection of at least one occupant of a vehicle, comprising:

a first sensor for generating a first signal indicative of an acceleration of the vehicle along a first axis;

a second sensor for generating a second signal indicative of an acceleration of the vehicle along a second axis oriented at an angle relative to the first axis;

a controller coupled to the first and second sensors and to the safety device, the controller controlling actuation of the safety device as a function of the first and second signals;

wherein the first and second sensors are arranged in a centralized unit.

30. An apparatus according to claim 29, wherein the centralized unit is a housing.

31. An apparatus according to claim 30, wherein the first axis is oriented in the direction of forward motion of the vehicle.

32. An apparatus according to claim 31, wherein the second axis is oriented at a right angle relative to the first axis.

* * * * *